US006892944B2

(12) United States Patent
Chung et al.

(10) Patent No.: US 6,892,944 B2
(45) Date of Patent: May 17, 2005

(54) ELECTRONIC VOTING APPARATUS AND METHOD FOR OPTICALLY SCANNED BALLOT

(75) Inventors: Kevin Kwong-Tai Chung, Princeton, NJ (US); Victor Jun Dong, Edison, NJ (US)

(73) Assignee: Amerasia International Technology, Inc., Princeton, NJ (US)

( * ) Notice: Subject to any disclaimer, the term of this patent is extended or adjusted under 35 U.S.C. 154(b) by 75 days.

(21) Appl. No.: 10/260,167

(22) Filed: Sep. 30, 2002

(65) Prior Publication Data

US 2003/0062411 A1 Apr. 3, 2003

Related U.S. Application Data

(60) Provisional application No. 60/326,265, filed on Oct. 1, 2001, provisional application No. 60/341,633, filed on Dec. 19, 2001, provisional application No. 60/377,824, filed on May 7, 2002, provisional application No. 60/382,033, filed on May 20, 2002, provisional application No. 60/385,118, filed on May 30, 2002, provisional application No. 60/389,635, filed on Jun. 17, 2002, and provisional application No. 60/403,151, filed on Aug. 12, 2002.

(51) Int. Cl.[7] ............................................. G06F 17/60
(52) U.S. Cl. ..................... 235/386; 235/51; 235/50 R
(58) Field of Search ................................ 235/51, 50 R, 235/50 A, 50 B, 54 F, 386, 454; 705/12

(56) References Cited

U.S. PATENT DOCUMENTS

| | | | |
|---|---|---|---|
| 4,641,240 A | * 2/1987 | Boram | 705/12 |
| 5,610,383 A | 3/1997 | Chumbley | |
| 5,635,726 A | * 6/1997 | Zavislan et al. | 250/559.44 |
| 6,081,793 A | 6/2000 | Challener et al. | |
| 6,250,548 B1 | 6/2001 | McClure et al. | |
| 6,412,692 B1 | 7/2002 | Miyagawa | |
| 6,769,613 B2 | 8/2004 | McDermott et al. | |
| 2001/0035455 A1 | 11/2001 | Davis et al. | |
| 2002/0066780 A1 | 6/2002 | Balolia | |
| 2002/0072961 A1 | 6/2002 | McDermott et al. | |
| 2002/0074399 A1 | 6/2002 | Hall et al. | |
| 2002/0084325 A1 | 7/2002 | Reardon | |
| 2002/0133396 A1 | * 9/2002 | Barnhart | 705/12 |
| 2003/0066872 A1 | * 4/2003 | McClure et al. | 235/51 |

OTHER PUBLICATIONS

Terry Costlow, "Computer Kiosk Expedites Voter Registration," IEEE Spectrum, Oct. 2002, 2 Pages.
AccuVote–TS, http://www.gesn.com/AccuVote–TS/accu-vote–ts.html, Global Election Systems, Inc., not dated, 4 Pages.
NEDAP, "Voting System," c 2000 4 Pages, no date.
Hart Interactive, "eSlate Electronic Voting System," http://www.worldwideelection.com/GoveSlate.cfm, 1998–2000, 2 Pages.
Alan Dechert, "The Voter Certified Ballot," Granite Bay, CA., http://www.go2zero.com/voterform.html, Feb. 13, 2001, 15 Pages.
Robert Wright, "Recasting The Voting Process," www.var-business.com, Mar. 5, 2001, 4 Pages.
Rebecca Mercuri, "A Better Ballot Box?", IEEE Spectrum, Oct. 2002, pp. 46–50.
Michael Stanton, "The Importance of Recounting Votes," http://www.notablesoftware.com/Press/electronic_voting_brasil.htm, Nov. 13, 2000, 3 Pages.
Bruce Schneier, "Voting and Technology," Crypto–Gram, http://www.notablesoftware.com/Press/Schneier.html, Dec. 15, 2000, 3 Pages.

* cited by examiner

*Primary Examiner*—Karl D. Frech
(74) *Attorney, Agent, or Firm*—Dann, Dorfman, Herrell & Skillman, P.C.

(57) ABSTRACT

A machine readable ballot comprises a ballot sheet having a voting identifier including a representation of election jurisdiction information and a unique ballot identifier. A plurality of contest regions each have two or more mark spaces for making voting selections. The contest regions correspond to contests in the jurisdiction represented by the election jurisdiction information, and the representation of election jurisdiction information and the mark spaces are machine readable.

51 Claims, 8 Drawing Sheets

| 380 → STATE | COUNTY | MUNICIPALITY | PRECINCT | WARD | POLITICAL PARTY | VOTER NUMBER |
|---|---|---|---|---|---|---|
| 3-DIGIT IDENTIFIER | 3-DIGIT IDENTIFIER | 4-DIGIT IDENTIFIER | 2-DIGIT IDENTIFIER | 2-DIGIT IDENTIFIER | 2-DIGIT IDENTIFIER | 4-10 DIGIT IDENTIFIER |
| 381 | 382 | 383 | 384 | 385 | 386 | 387 |

| MACHINE-READABLE VID# and Human readable VID# | 120 |
|---|---|

Election Characterization
(Precinct, Date, General/Primary, etc.)

"NAME and other features of the ___ contest" Please choose and rank every candidate. Your first choice should have one filled circle, the 5th choice should have five filled circles. 112'

| Candidate #1 ⟵112 | Candidate #2 | Candidate #3 ⟵112 | Candidate #4 |
|---|---|---|---|
| Candidate #5 | Write-In Candidate 116 | Write-In Candidate 116 | Write-In Candidate 116 |
| Write-In Candidate 116 | Write-In Candidate —112 | Skip-Contest/Abstain for balance of the vote | —114 —112  110-R |

"NAME and other features of the ___ contest" (Cumulative Voting)
You have five votes and thus the right to fill in five circles among the candidates below. You can put all five votes in one candidate by filling in five circles. You may also choose to distribute five in any way you want.

| Candidate #1 ⟵112 | Candidate #2 | Candidate #3 | Candidate #4 |
|---|---|---|---|
| Candidate #5 ⟵112 | Write-In Candidate 116 | Write-In Candidate 116 | Write-In Candidate 112' |
| Write-In Candidate | Write-In Candidate 116 | Skip-Contest/Abstain for balance of the vote | —114 —112  110-C |

| NAME and other features of the ___ contest. Choose 2 only |
|---|

| Candidate #1 112⟵○ | Candidate #2 ○ | Candidate #3 ○ | Candidate #4 ○ |
|---|---|---|---|
| Candidate #5 112⟵○ | Candidate #6 ○ | Candidate #7 112⟵○ | Candidate #8 ○ |
| Candidate #9 112⟵○ | Candidate #10 ○ | Candidate #11 ○ | Write-In Candidate #1 116 ○ |
| Write-In Candidate #2 116 ○ | Skip-Contest/Abstain for balance of the vote —114 —112 | | 110 |

| NAME and other features of the ___ contest. Choose 1 only |
|---|

| Candidate #1 ○ | Write-in Candidate 116 ○ | Skip-Contest/Abstain for balance of the vote ○ | 110 |
|---|---|---|---|

.# ELECTRONIC VOTING APPARATUS AND METHOD FOR OPTICALLY SCANNED BALLOT

This Application claims the benefit of:

U.S. Provisional Application Ser. No. 60/326,265 filed Oct. 1, 2001, of

U.S. Provisional Application Ser. No. 60/341,633 filed Dec. 19, 2001,

U.S. Provisional Application Ser. No. 60/377,824 filed May 7, 2002,

U.S. Provisional Application Ser. No. 60/382,033 filed May 20, 2002,

U.S. Provisional Application Ser. No. 60/385,118 filed May 30, 2002,

U.S. Provisional Application Ser. No. 60/389,635 filed Jun. 17, 2002, and

U.S. Provisional Application Ser. No. 60/403,151 filed Aug. 12, 2002.

The present invention relates to a voting apparatus and method and, in particular, to voting apparatus and method employing an optically read ballot.

Under current election law and regulations in certain jurisdictions, a paper record of certain voter's voting selections must be made and preserved. Most commonly, a paper voting record or ballot must be utilized for absentee voting and/or for provisional voting. Absentee voting is where a voter who will be absent from the jurisdiction or otherwise unable to be present at a designated polling location during the time for voting is issued a paper ballot in advance of the election and votes by completing and submitting the paper absentee ballot by hand, mail, messenger, or other permitted means. Provisional voting is where a voter who is unable to establish his eligibility to vote at a polling place during an election is issued a paper ballot and is permitted to vote thereby "provisionally," i.e. by sealed paper provisional ballot that is only opened and counted if the eligibility of the provisional voter to vote is established by election officials after the time for voting ends.

Irrespective of whether a jurisdiction utilizes paper ballots or more modern electronic voting machines, absentee and provisional ballots must be handled separately and counted manually by election officials, i.e. apart from the votes recorded by voters voting normally (e.g., by voting machine) in the election, and may delay the completion of tabulating the voting results and/or the certification thereof.

Certain jurisdictions even require a paper absentee and/or provisional ballot even where the absentee and/or provisional voting is done on an electronic (DRE) voting machine. In addition, because the paper ballots approved for being counted are placed into groups so that they are anonymous for counting, there is no way for a voter to know whether his vote was counted and/or was counted correctly.

The prevalent paper ballot is an optically read or optically scanned paper ballot on which a voter marks his voting selections by darkening or otherwise marking one or more regions typically indicated by an outline in the shape of a circle, oval, rectangle, square or other desired closed shape. A different paper ballot, i.e. a customized ballot, is typically required to be prepared for each election and jurisdiction, e.g., voting district or precinct. In addition, a corresponding customized template must be provided for each different paper ballot, thereby necessitating the manual sorting of the paper ballots by voting district or precinct and the separate reading/scanning thereof for each voting district or precinct.

Accordingly, it would be desirable to have an apparatus and a method for processing paper ballots, such as optically scanned or optically read ballots, in a more efficient manner and preferably one suitable for use with a modern electronic (e.g., DRE) voting machine To this end, a reader for reading ballots comprises means for imaging each ballots transported including imaging a jurisdiction identifier and the voting selections marked thereon; and a processor receiving the imaged jurisdiction identifier for selecting a template and for recording the voting selections marked on each ballot in accordance with the selected template.

According to a further aspect, a method for reading ballots comprises;

reading each ballet including reading a jurisdiction identifier thereof and voting selections marked thereon; and processing the jurisdiction identifier for each ballot for selecting a template; and recording the voting selections marked on each ballot in accordance with the selected template.

BRIEF DESCRIPTION OF THE DRAWING

The detailed description of the preferred embodiments of the present invention will be more easily and better understood when read in conjunction with the FIGURES of the Drawing which include:

FIG. 4 is a schematic diagram illustrating an example ballot including ranked and/or cumulative voting that is intended to be read by an optical reader;

Figure 1:
FIG. 1 is a schematic diagram illustrating an example ballot intended to be read by an optical reader.

In the Drawing, where an element or feature is shown in more than one drawing figure, the same alphanumeric designation may be used to designate such element or feature in each figure, and where a closely related or modified element is shown in a figure, the same alphanumerical designation primed may be used to designate the modified element or feature. Similarly, similar elements or features may be designated by like alphanumeric designations in different figures of the Drawing and with similar nomenclature in the specification, but in the Drawing are followed by a character unique to the embodiment described. It is noted that, according to common practice, the various features of the drawing are not to scale, and the dimensions of the various features are arbitrarily expanded or reduced for clarity.

DESCRIPTION OF THE PREFERRED EMBODIMENT(S)

The arrangement of the present application operates in conjunction with an electronic voting machine, also referred to as electronic voting apparatus and/or as a direct recording electronic (DRE) voting apparatus. Suitable voting apparatus, and methods employed therewith, are described in U.S. patent application Ser. No. 09/737,306 entitled "Electronic Voting Apparatus, System and Method" filed Dec. 15, 2000 and in U.S. patent application Ser. No. 10/255,348 entitled "Electronic Voting Apparatus, System and Method" filed Sep. 26, 2002 (Applicant's No. Al-TECH-30A), which applications are hereby incorporated herein by reference in their entireties.

FIG. 1 is a diagram illustrating an example ballot 100 intended to be read by an optical reader. Ballot 100 includes four regions 110 each containing information pertaining to a particular election contest or question and a number of marking regions or mark spaces 112 therein in which a voter makes a mark to select one or more voting selections for the particular election contest or question. Mark spaces 112 may be any convenient closed shape and provide a defined area in a defined location in which a voter marks his voting selections by darkening or otherwise marking therein. Mark spaces 112 are typically indicated by an outline in the shape of a circle, oval, rectangle, square or other desired closed shape. After the ballot 100 is marked by the voter, it is voted (e.g., deposited in a ballot box or otherwise submitted) and is read and tabulated, typically by a reading machine or reader that optically reads or senses the defined mark spaces to determine whether each mark space 112 is marked or unmarked, thereby indicating a voting selection. The reading machine is programed to define a "template" corresponding to the locations on the ballot where each of the contests/questions 110 and the respective mark spaces 112 therefor are located.

In the example illustrated, a first region 110 designated "General Election (1/4)" contains the names and party affiliations of candidates for "President and Vice President" and a mark space 112 for each set of candidates, as well as mark spaces 112 for a "Skip Contest" or "No Vote" (abstain) selection 114 and for a write-in candidate selection 116. A second region 110 designated "General Election (2/4)" contains the names and party affiliations of candidates for "United States Representative (District 16)" and a mark space 112 for each candidate, as well as mark spaces 112 for a "Skip Contest" or "No Vote" (abstain) selection 114 and for a write-in candidate selection 116. A third region 110 designated "General Election (3/4)" contains the names and party affiliations of candidates for "State Senator" and a mark space 112 for each candidate, as well as mark spaces 112 for a "Skip Contest" or "No Vote" (abstain) selection 114 and for a write-in candidate selection 116. A fourth region 110 designated "General Election (4/4)" contains a question put before the voters designated as "State Question 214" and a mark space 112 for a "Yes" or "No" selection, as well as a mark space for a "Skip Contest" or "No Vote" (abstain) selection 114.

In addition, each ballot includes a voter registration number 120, also known as a voter identifier number or voter identification number, commonly abbreviated as "VID." Identifier or VID 120 is preferably located at a predefined location on ballot 100, e.g., near the upper right hand corner as illustrated. VID 120 may be provided in any convenient machine readable format, including but not limited to a bar code, two-dimensional bar code, a prescribed font, optical character recognition (OCR) characters, alphanumeric characters, non-alphanumeric characters, symbols, and the like. Typically, however, a human-readable number 120N and an equivalent simple machine-readable bar code 120C are satisfactory.

Figures 2, 3A:
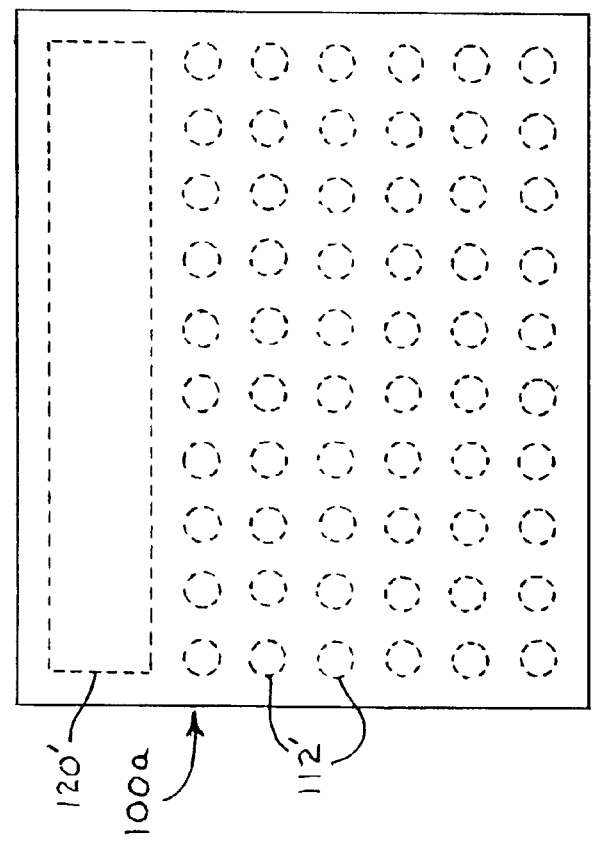
FIG. 2 is a schematic diagram illustrating an example format for a voter identifier (VID)
FIGS. 3A, 3B and 3C are schematic diagrams illustrating a generalized example ballot intended to be read by an optical reader.

FIG. 2 is a schematic diagram illustrating an example format 380 for a voter identifier (VID) 120. VID 120 is a sequence of numbers or other alphanumeric characters or symbols that uniquely identify a voter and provide voting information relating to the voter that may be utilized by a voting machine or by a ballot reading machine or by election officials. VID format 380 includes, for example, six different informational fields 381–386. Field 381 includes a number of characters, typically 3, that uniquely identify the voter's state of residence and field 382 includes a number of characters, typically 3, that uniquely identify the voter's county of residence. Fields 381–386 may be used for automatic reading and tabulation of different ballots without manual or other sorting prior to their being read and tabulated, as well as for absentee and provisional voting. While a three-digit numerical field is typical, providing up to 999 different entries, two-digit fields may be utilized where a lesser number (i.e. 99 or less) of possible entries are needed, as in the United States where there are only 50 states. Any field may be of greater or lesser number of characters as is convenient.

Field 383 includes a number of characters, typically 4, that uniquely identify the voter's municipality of residence. Field 384 includes a number of characters, typically 2, that uniquely identify the voter's voting precinct or district within the county or municipality, and field 385 includes a number of characters, typically 2, that uniquely identify the voter's voting ward, if any, within the voting precinct or district. Field 386 includes a number of characters, typically 2, that uniquely identify the voter's political party affiliation if any has been declared and may be utilized for presenting the ballot of the declared political party for voting in a party primary election or for straight party voting, where permitted.

Field 387 includes a number of characters, typically 4–10, that uniquely identifies the particular ballot in the applicable county, voting precinct, district and/or ward, as the case may be. The random generated number, field 387, is a randomly-generated unique identifier that is printed on a ballot prior to the election, and may or may not be traceable to the identity of a particular voter, as desired for security and privacy. The same unique identifiers as are printed on paper ballots, e.g., for absentee and/or provisional voting, may be stored in a voting machine or in a vote tabulating machine for verifying the authenticity and uniqueness of ballot when it is tabulated.

In the United States, voting is typically conducted on a state by state basis, and most states delegate to its counties the conduct of elections. In local voting, i.e. voting wherein a particular voting machine is dedicated for voting by voters of a particular county, municipality, precinct, district or ward, fields 382–385 may be utilized by the voting machine or vote tabulating machine to verify that the voter is using the proper ballot form before the voting session is initiated and/or before the voting selections marked on the ballot are tabulated, e.g., in provisional voting. Typically in local voting, the voting machine is situated in a location in a particular precinct, district or ward and voters from that particular voting precinct, district or ward come to that location to vote, and provisional and/or absentee voters may vote using such voting machines even though their voting selections are then reproduced on a printed ballot, e.g., as printed by a printer associated with the voting machine.

Data from fields 381–386 is utilized to select the voting screens and/or voting contests to be presented on a voting machine and/or on one or more printed ballot sheets that together comprise a proper complete election ballot for that voter in a given election. Each voting machine may generate on a voter-by-voter basis a complete election ballot by selectively combining, for example, a "general ballot" including one or more voting contests 110 that are to be presented to all voters, a "residence-specific ballot" including one or more voting contests 110 to be presented to voters according to their residence, and/or a "party-specific ballot" including one or more voting contests 110 to be presented to voters in a party primary election according to their party affiliation. Thus, a voting machine and/or ballot printer is not constrained or limited to local voting, but may be utilized for county-wide or state-wide or nation-wide voting, for regional voting, and/or for remote voting.

Where voters are issued a chip card or smart card containing his VID number 120 and an electronic voting machine is utilized for printing paper ballots, the voting machine is responsive to voting jurisdiction information 381–386 read from each voter's chip card for providing a ballot to the voter and may retain the chip card for the writing of the voter's voting selections therein and then collects the chip card in a collection container or may allow an election official to have the chip card. Optionally, the voting machine and/or vote tabulating machine may reject the chip card and/or the paper ballot 100 if the voter registration information 381–386 and/or the unique identifier 387 read therefrom do not match corresponding information stored in the voting machine and/or vote tabulating machine, and may return or collect the chip card. In either case, the chip card once inserted into the voting machine may be retained in a way that the voter may not retrieve the chip card, e.g., for securing the card against use to vote more than once. For provisional voting, the chip card may be likewise retained until the voting selections of a provisional voter are stored therein, and then may be returned to the provisional voter and/or a voting official, e.g., with a proper authorization. Unique identifiers 387 once used for an election may be "retired" and not used in one or more subsequent elections as a means to reduce the likelihood of fraudulent in a future election, e.g., either as a VID number 120 and/or by a counterfeit smart card.

Figure 3B:
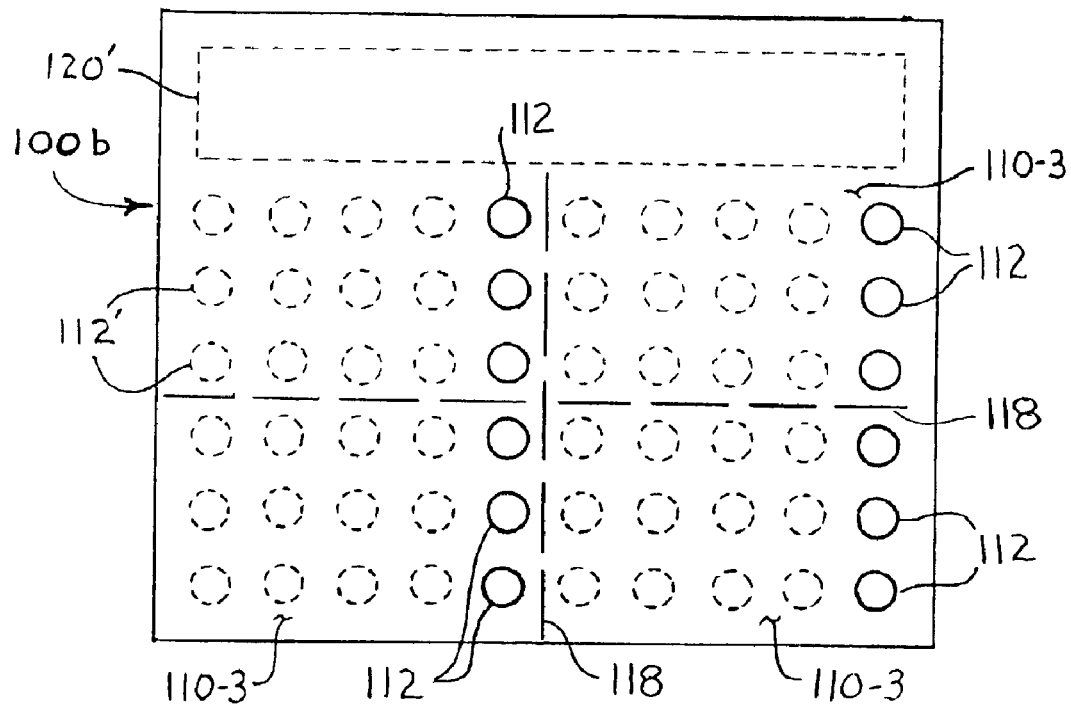
Figure 3C:
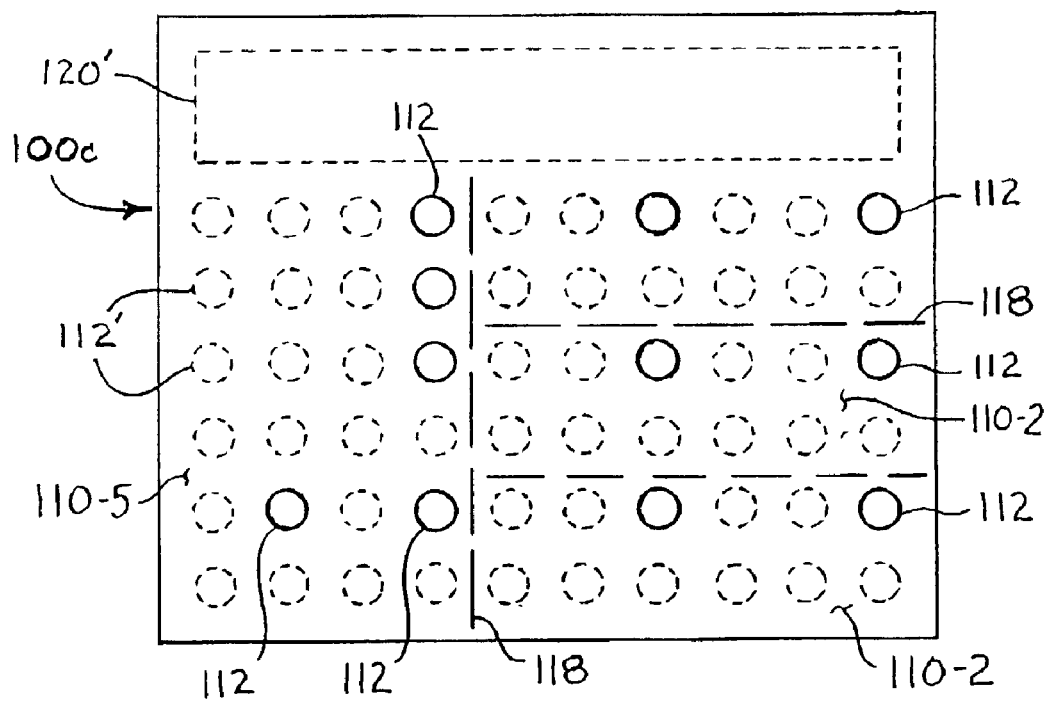

FIGS. 3A, 3B and 3C are schematic diagrams illustrating a generalized example ballot 100 intended to be read by an optical reader. Generalized ballot format 100R of FIG. 3A has a plurality of locations 112' at which mark spaces 112 may be provided and has a region 120' in which a VID number 120 may be represented. Ballot format 100R is generalized in that it illustrates all possible mark space locations 112' and a relatively large region in which a VID number 120 representation may be provided. An actual ballot format will typically be on a standardized paper, such as an 80-column machine readable card or an 8½×11 inch or an A size paper, and have many more possible mark space locations 112'.

In any particular ballot 100, less than all of possible mark space locations 112' will be utilized as mark spaces 112 and less than the entire region 120' will typically be utilized for providing the VID number 120 representation. Generalized ballot format 100R represents a ballot pattern from which particular ballots 100 and areas for particular contests 110, each utilizing specific selected ones of mark space locations 112', according to a template, may be provided.

FIG. 3B illustrates an example ballot 100B which is provided from a ballot format 100R on which contest regions 110 are defined by dashed lines 118 in the region having the possible mark spaces 112' and in which ones of possible mark spaces 112' to be utilized for marking voting selections are mark spaces 112 defined by solid line circles. The dashed lines 118 defining contest regions 110 and the mark spaces 112 that may be selected together define a template for ballot 100B, i.e. define the pattern by which voting selections will be marked for each of plural voting contests as well as the pattern by which voting selections will be read by a vote tabulating machine or reader for each of the voting contests in tabulating the vote. The template of ballot 100B defines four contest areas 110 of the same size, with each having three active mark spaces 112. Each three mark space contest 110-3 might be utilized, e.g., for a contest among three candidates, or for a contest among three candidates where mark spaces are provided for a "No Vote" selection and a write-in selection, or for a public question or other "Yes-No" response matter where a mark space is provided for a "No Vote" or "Abstain" selection.

FIG. 3C illustrates an example ballot 100R which is provided from a ballot format 100R on which contest regions 110 are defined by dashed lines 118 in the region having the possible mark spaces 112' and in which ones of possible mark spaces 112' to be utilized for marking voting selections are mark spaces 112 defined by solid line circles. The dashed lines 118 defining contest regions 110 and the mark spaces 112 that may be selected together define a template for ballot 100R, i.e. define the pattern by which voting selections will be marked and tabulated. The template of ballot 100R defines four contest areas 110 of two different sizes, one having five active mark spaces 112, and three having two mark spaces 112. The five mark space contest 110-5 might be utilized, e.g., for a contest among five candidates or for a contest among three candidates where mark spaces are provided for a "No Vote" or "Abstain" selection and for a write-in selection. Each two-mark space contest 110-2 may be utilized, e.g., for a public question or other "Yes-No" response matter.

FIG. 4 is a schematic diagram illustrating an example ballot 100 including ranked and/or cumulative voting that is intended to be read by an optical reader. Ballot 100 includes a plurality of contest areas 110 (each having a region "NAME and other features of the contest" in which information identifying the particular contest and mark spaces for selecting a candidate are placed) and has a VID area 120, as described above. A first contest area 110-R is arranged for conducting ranked voting wherein the voter may rank the candidates in his order of preference. In this example, five candidates may be ranked. Filling one mark space 112 indicates first choice ranking, filling two mark spaces 112 indicates second choice ranking, and so forth. The opposite sense, where marking a greater number of mark spaces for a candidate indicates a greater preference, could also be utilized. Thus, five mark spaces 112 are associated with each candidate's name and with each write-in candidate position 116.

Ranked voting may be utilized for conducting an "instant run-off" where no candidate or an insufficient number of candidates receives sufficient first-choice votes to be elected (e.g., fails to receive a majority of the votes cast) under the election rules in effect. If no candidates win or fewer than the required number win, a run-off election is required. Conventionally the run-off election occurs later in time and incurs the expense of conducting a second election. In an instant run off, so called because the voting needed for the run off are cast in the initial election and so are immediately ("instantly") available. In an instant run-off election, candidate(s) receiving the least first choice votes are eliminated and the voters' second choice rankings of candidates other than those eliminated are then counted to determine the winner(s). One mark space 112 is provided to skip the entire contest and/or to abstain 114 for the balance of that contest, i.e. to intentionally under vote. The voting apparatus and ballots described herein permit an instant run-off election to be conducted automatically and electronically if no winner emerges from the initial voting.

A second contest area 110-C of ballot 100 is arranged for conducting cumulative voting wherein the voter may distribute a given number of votes among the candidates in his order of preference, typically where more than one candidate is to be elected in a given contest. Cumulative voting allows the voter to distribute his vote among any one or more of the candidates rather than being limited to voting for or not voting for each candidate equally, as in straight voting. In this example, five votes may be cast (five mark spaces 112 may be marked) in the contest and the five votes may be cast for any one or more candidates. Filling more mark spaces 112 for a candidate indicates a greater number of votes, and thus a greater preference, for that candidate. Thus, five mark spaces 112 are associated with each candidate's name and with each write-in candidate 116. One mark space 112 is provided to skip the entire contest and/or to abstain 114 for the balance of that contest, i.e. to intentionally under vote.

Alternatively to providing plural mark spaces 112 for each candidate for conducting ranked and/or cumulative voting, mark space 112 may be arranged as a seven-segment mark space 112' wherein selected ones of the seven segment spaces thereof may be marked to define a numeral. For example, marking the two vertical segments at the left or at the right indicates the number "1", marking the top, middle and bottom horizontal segments and the upper right and lower left vertical segments indicates the number "2", marking all seven segments indicated the number "8", and so forth, in like manner to illuminating selected segments of a seven-segment display to display numbers.

The two remaining contest areas 110 of ballot 100 are examples of straight voting for two different example contests, one in which two candidates of eleven are to be elected and the other in which one candidate is to be elected.

Figure 5:
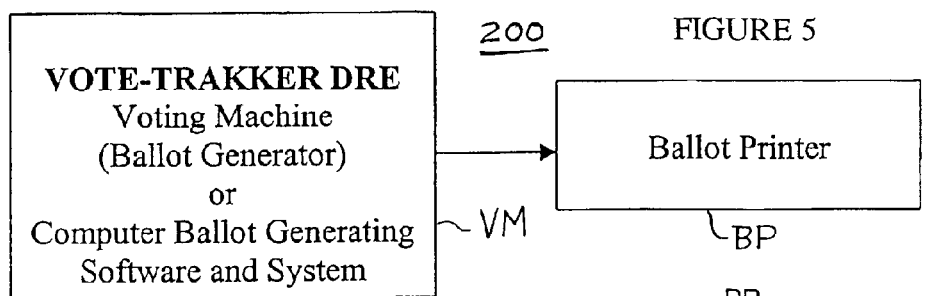
FIG. 5 is a schematic block diagram of an example ballot generating apparatus.

FIG. 5 is a schematic block diagram of an example ballot generating apparatus 200. Apparatus 200 includes a processor for generating ballots 100 from information provided thereto either by election officials entering contest information, candidate information and the like, i.e. for generating ballot form and/or formats for particular jurisdictions and/or sub-divisions thereof. The processor may be the processor included in an electronic voting machine that includes ballot generating capability, such as the VOTE-TRAKKER™ direct recording electronic voting machine available from Avante International Technology, Inc. located in Princeton Junction, N.J., described in patent applications Ser. No. 09/737,306 and 10/255,348, or may be a computer running suitable ballot generating software.

Ballot printer BP may be a conventional ballot printer that prints ballots provided it is capable of printing the VID number 120 in machine- and/or human readable form and of printing the unique random portion of the VID 120, or may be a printer associated with voting machine 2M. The actual format of ballots 100 will be in conformance to the applicable federal, state, county, and/or local legal requirements for election ballots, as is the case for conventional optically-scanned ballots. Thus, standardized paper sizes, e.g., 8½×11 inches or 8½×14 inches or A4 metric paper, may be utilized, and single-page ballot requirements, minimum font size standards, candidate ballot space standards, and the like, will be met, in a customized and/or conventional ballot format. For example, ballots 100 may be conventional ballots such as a Scantron ballot, which has an array of 48×80 elliptical mark spaces on an 8½×11 inch paper ballot, onto which is added VID number 120 in machine- and/or human-readable form as described herein.

Figure 6:
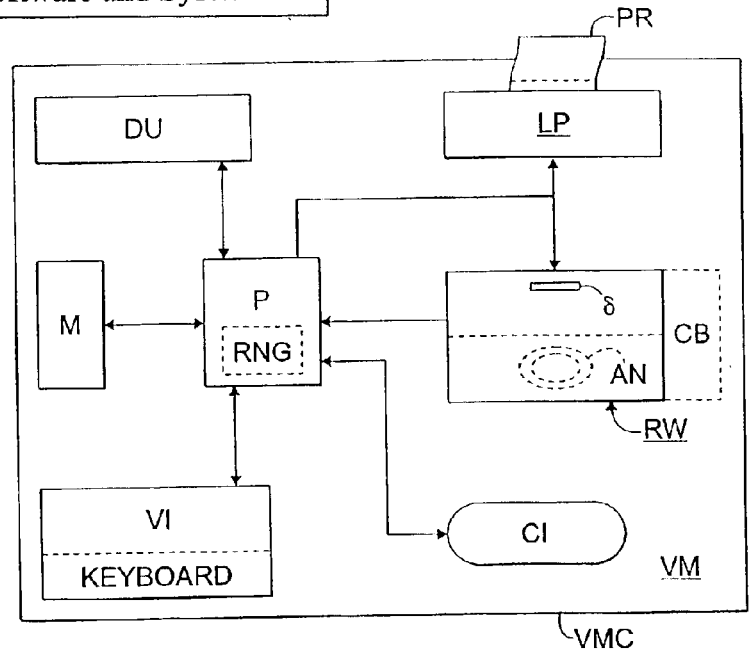
FIG. 6 is a schematic block diagram of an example voting apparatus.

FIG. 6 is a schematic block diagram of an example voting apparatus VM as shown and described in patent applications Ser. Nos. 09/73 7,306 and 10/255,348 incorporated herein. Voting machine VM includes a processor P for processing information relative to a voter and/or voting and for providing a voting session identifier, a non-volatile memory M for storing and providing such information, a display unit DU for displaying information to the voter, and a voter interface VI whereby the voter can enter information into voting machine VM for processor P and/or memory M. It is noted that the components of voting machine VM are similar to the components of a personal computer and so a conventional personal computer, with or without modification, may be utilized in voting machine VM, although it is likely that conventional computer components, particularly processor P and memory M, may be utilized in conjunction with displays DU and input devices VI adapted to or customized for the voting machine application, for example, for ruggedness, resistance to tampering and/or abuse. In addition, processor P includes a function for providing unique voting session identifiers for each voting session, for example, a random-number or random-character generator RAG or a look-up table or other suitable generator. Voter interface VI may be a touch screen and so would provide display DU and a keyboard.

Memory M may also be of any suitable non-volatile memory type. Suitable memory devices include floppy disks, computer hard disk drives, writeable optical disks, memory cards, memory modules and flash memory modules (such as those utilized in electronic cameras), magnetic and optical tapes and disks, as well as semiconductor memories such as non-volatile random-access memory (RAM), programmable read-only memory (PROM), electronically erasable programmable read-only memory (EEPROM) and the like. Memory M or a separate memory contains the operating system, data base and application software that operates processor P as voting machine VM.

Alternatively, various programming information, a voting session identifier generator or list, voting information, candidate and office information and the like may be provided in firmware, such as in an EPROM, which provides additional resistance to tampering and/or hacking attack. Such firmware may be utilized, for example, for controlling the reading and writing of information to optional smart cards SC, the storing of voting record information in memory M, particularly, a specific memory device such as a memory chip card, an optical disk or tape, or other electronic, magnetic or optical media. Preferably, memory M of voting machine VM includes two independent non-volatile memory devices so that voting record information and a voting session identifier are stored on two separate, independent memory devices for redundancy and preservation of at least one copy of the accumulated voting records in the event one of the memory devices fails or otherwise becomes inoperative. Desirably, the two non-volatile memories are of different types, such as a semiconductor memory and a hard disk, or a memory card and an optical disk, or any other convenient combination.

Voter interface VI may be a standard or custom keyboard, as may facilitate write-in voting, or may be dedicated vote buttons or switches similar to conventional mechanical voting machines, for example, or may be a touch-screen interface associated with display unit DU, and is typically connected to processor P via cabling. Special keys can be provided for voting functions such as "Elect" or "Select" or "Vote," or for "Erase" or "Change," or for "Write-in." Alternative voter interfaces VI may include voice recognition apparatus, Braille keyboards or pen systems with writing recognition interfaces, each preferably with confirmation of the data entered displayed on display unit DU or even aurally via headphones. For a "standard" computer keyboard, for example, it is preferred that the "function keys," i.e. those keys that can be used for a purpose other than voting, such as to access and/or control the operating system and other programs, e.g., the F1–F12 keys, be disabled or rendered inoperative, either by software control or physical means.

In addition, a voter interface VI for allowing visually impaired voters to vote without assistance may employ a modified standard keyboard of which only certain keys are responded to in combination with an aural device. e.g., only the four keys (buttons) at the corners of a numeric keypad or the four areas (buttons) in the four corners of a touch screen may be enabled to indicate possible selections such as vote, skip, next, previous, and the like, with audible voice instructions and confirmation of buttons pressed provided via a headphone. A typical function assignment to the corner keys can include: upper right key="repeat" (to hear voice message again), lower right key="Enter" (to make a selection within the allotted time), lower left key="Cast Vote" (and proceed to the next contest), and upper right key="Increase Speed" (to increase the rate at which contests and/or voice indications are presented). Any or all of these functional keys may be exaggerated in size or otherwise made easily distinguished by tactile feel. Such keyboard/button programming is commonly provided by software.

Display unit DU may be of any suitable type, such as a conventional cathode ray tube or computer display, an LCD display, a touch-screen display or other suitable device, for displaying alphanumeric and/or graphical information, or a set of illuminated buttons, as desired, and is typically connected to processor P via cabling. Display unit DU may also include Braille devices, aural information via headphones, or other devices specially suited for people with handicaps.

Operatively associated with or coupled to processor P and memory M are a printer LP for providing a tangible record of the voting session, e.g., a printed paper receipt and an optional smart card reader/writer RW for writing and/or reading information from/to a smart card. Preferably, local printer LP and optional reader/writer RW are built into the physical container VMC of voting machine VM along with processor P. memory or memories M, display DU and voter interface VI, and that physical container VMC is rugged and sealable for security and to prevent unauthorized access to the components therein, thereby being resistant to tampering. Other voting booth components, such as a privacy curtain, the opening and closing mechanism therefor, or a floor stand, need not be part of voting machine container VMC, but may be permanently or demountably attached thereto as is convenient.

Optional smart card reader/writer RW is operatively associated with or coupled to processor P and memory M for writing information including at least a unique voting session identifier and a voting record into the memory of a smart card SC and optionally for reading information, such as voter registration and/or identifying information, from a smart card. Each voting session identifier is a randomly-generated unique identifying or serial number or character sequence (e.g., a pseudo-random number) of at least eight characters or digits, and preferably of 12 or more characters or digits. Such voting session identifiers are generated for each voting session of each election, either centrally and then loaded into memories M of voting machines VM or by processor P as each voter participates in a voting session. It may be desirable for the voting session identifiers to include additional characters identifying voting district and br the polling place and/or the voting machine MM on which the vote associated with the identifying number was cast, and/or the date and time of the voting session, but not the voter, so as to preserve voter anonymity while providing traceability of voting records. If any information particular to an individual voter is stored in the memory of smart card SC, as may be the case where information confirming voter registration or an identifying PIN number, security code or other personal data is utilized, such information is written over or erased or otherwise rendered permanently unrecoverable either before or at the time that voting record and voting session identifier information is stored in the memory of smart card SC by reader/writer RW of voting machine VM.

For optical ballot voting, voting machine VM generates a ballot format 100 for a particular jurisdiction, for example, according to a pre-programmed ballot information and/or in response to the voting jurisdiction information corresponding to the voter's VID number (fields 381–386) as entered via voter interface VI and/or a smart card and reader RW, as the case may be. The ballot format is generated by processor P as described above and in incorporated patent application Ser. Nos. 09/737,306 and 10/255,348, with a format layout for contests 110 consistent with local election requirements rather than as a series of voting screens. Ballot 100 so generated is printed by printer LP and is provided to the voter, e.g., by hand for provisional voting and/or by mail for absentee voting. Ballots 100 may be printed in advance of an election and/or may be printed during an election on a demand, i.e. as needed, basis.

If reader/writer RW is a contact-type reader for use with contact-type smart cards, then the smart card SC is inserted into slot S thereof to be read and/or written to. If reader/writer RW is a wireless or contact-less -type reader for use with wireless or contact-less-type smart cards, then the smart card SC is placed proximate to antenna AN of reader/writer RW to be read from and/or written to. If reader/writer RW is of a type for use with both contact-type and wireless or contact-less -type smart cards, then the smart card SC is inserted into slot S if it is a contact-type smart card and is placed proximate to antenna AN if it is a wireless-type smart card, or is either inserted into slot S or is placed proximate antenna AN if it is a so-called "combos-card" that combines both external contacts and an internal antenna so that it can be read from or written to either via contacts or a wireless communication.

Further, while optional smart card encoder RW need only be able to write information to a smart card, it may also read information stored in a smart card SC and provide same to processor P. Reader/writer RW may also be a decoder to decode information read from a smart card SC in encrypted or encoded form, and/or may also be a coder that encrypts or encodes information being written to the smart card SC. Such encryption and/or encoding may use public key encryption or any other suitable encryption and/or coding arrangement. Optionally, and preferably, reader/writer RW may include a "take-in" or capture mechanism that grabs smart card SC when it is inserted into slot S and, after the voting record and voting session identifier information is stored in the memory of smart card SC, deposits smart card SC into a secure collection box CB operatively associated with reader/writer RW and located in voting machine cabinet VMC. If this option is utilized, and it may be utilized with either contact-type or wireless smart cards SC, a separate collection box CB and action by each voter to deposit his or her smart card SC therein is not needed.

Local printer LP may provide a tangible independent record of each individual voter's voting selections associated with the voter's unique identifying number and/or may be utilized to print ballots 100. Printer LP if utilized for printing voting receipts is of a type that retains no record of the data printed (e.g., is not a daisy wheel or other printer employing a ribbon or other sheet-type ink source from which information printed may be extracted or reconstructed) such as a thermal printer, a dot matrix printer, an ink-jet printer, a bubble jet printer, a laser printer and the like, which are conventional. A specialty or security-type of paper, or other medium making authentication of a printed receipt and/or a printed ballot 100 easier and counterfeiting of altering of same more difficult, can be utilized, thereby reducing the likelihood of counterfeiting or fraud. Desirably, printer LP also prints information identifying the election district, the date and time of voting and similar information that may help to authenticate printed receipt PR and/or optical ballot 100.

The preferred VOTE-TRAKKER™ voting system and apparatus as illustrated by FIG. 4 is provided in incorporated patent application Ser. Nos. 09/737,306 and 10/255,348. Desirably, the VOTE-TRAKKER™ voting system and apparatus provides redundancy for voting record and voting session identifier data in that each vote is recorded by at least one additional independent and verifiable means: to wit, by electronic recording in the memory of a smart card separate from the voting machine and the printed record. This apparatus, and the method it performs, can provide 100% transparency of each and every vote and can maintain 100% privacy and confidentiality of each and every voter and vote, although other embodiments may not do so.

Figure 7:
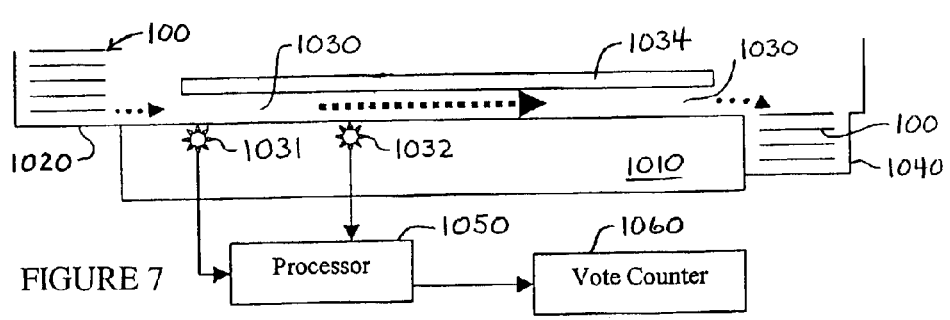
FIG. 7 is a schematic diagram illustrating an example ballot reader for reading optically read ballots of the sorts illustrated in FIGS. 1, 3A–3C and 4.

FIG. 7 is a schematic block diagram illustrating an example ballot reader apparatus 1000 for reading machine-readable ballots 100. Ballot reader apparatus 1000 includes reading device 1010 that has an input container 1020 into which ballots 100 to be read are placed for being fed through transport path 1030 to an output container 1040 into which ballots 100 that have been read as they pass through transport path 1030 are deposited, i.e. are collected. Therebetween, ballot transport path 1030 defines a path through which ballots 100 are transported for being read as they are transported between input container 1020 and output container 1040. Transport path 1030 includes two readers 1031 and 1032 of reader device 1010 which read the information and/or markings on ballots 100 as they pass thereby. Preferably, ballots 100 are optically-read ballots 100 of the sorts illustrated in FIGS. 1 and 3A–3C and readers 1031 and 1032 are optical readers. Member 1034 may be a guide for transport path 1030 that also provides a light shield for optical readers 1031, 1032.

It is noted that conventional optical readers have only one optical reader and must be preprogrammed with a template corresponding to the particular ballots to be passed therethrough and read, and so the ballots must be sorted by jurisdiction and the like so that only ballots of the same form, i.e. of the form that corresponds to the preprogrammed template, are passed through to be read at any one time. Ballots of different format must be passed through as separate batches after the corresponding template therefor has been programmed into the optical reader. Even if a conventional optical reader were to have two optical readers, both optical readers thereof would be programmed for reading the ballots against the same preprogrammed template, i.e. would be for making redundant readings for verifying the correctness of either reading against one predetermined preprogrammed template.

On the other hand, reader 1010 includes two readers 1031 and 1032 and a processor 1050 that cooperate for reading ballots 100 of different forms without the need to pre-sort the ballots into groups of like form. Specifically, optical reader 1031 reads ballots 100 for reading the VID number 120 thereon and communicates the VID number 120 to processor 1050. Reader 1031 need not read any other part of ballots 100. Processor 1050 is responsive to the VID number 120 read from each ballot 100 by reader 1031 to identify and select the ballot template corresponding thereto. Optical reader 1032 reads ballots 100 for reading the mark spaces 112 thereon that have been marked for comparison in accordance with the ballot template selected by processor 1050.

The VID number 120 read from each ballot 100 by reader 1031 should include at least the jurisdictional information fields thereof, e.g., fields 381–386, utilized to identify and select the ballot template. Optical reader 1031 should also read the unique random number field, e.g., field 387, so that the unique random number portion of VID 120 is associated with the stored voting selection information and is available for later verification of the ballot and/or of the correct reading thereof, as well as for tracking of his vote by the voter, e.g., via an Internet or other posting, as described herein. Where VID 120 is on ballot 100 in two different forms, e.g., in machine-readable form and in human-readable form, reader 1000 may have the ability to read both forms of VID 120, e.g., a bar-code reader and an OCR reader, usually in processor 1050.

Reader 1032 need not read portions of ballot 100 other than those containing valid mark spaces 112 according to the template corresponding to that ballot. The unnecessary portions of ballot 100 not containing valid mark spaces 112 may either not be read or may be read and then discarded while retaining the readings of mark spaces 112. Only images of the VID and mark space zones need be obtained and stored for tabulating and/or verifying voting by vote counter 1060. Images of the VID and mark space zones may be stored in any suitable electronic format including but not limited to .BMP, .TIFF, .PDF or any other suitable format. In this way, the amount of storage capacity needed to store the information read from each ballot is substantially reduced because the standardized information, e.g., names of contests, names of candidates, and the like, are not stored.

As a result, ballots 100 placed into input container 1020 do not have to be presorted to be of the same format, but may be of different formats because readers 1031, 1032 in cooperation with processor 1050 determine the proper template to be utilized for reading each ballot 100 according to its format. Specifically, because the information in fields 381–386 of each VID number 120 printed on each ballot 100 define the particular voting jurisdiction (e.g., state, county, municipality, precinct, ward and/or political party), they also define the form of ballot 100 for such jurisdiction. From the VID number 120 read by optical reader 1031, processor 1050 determines the jurisdiction and the ballot form therefor and supplies the template therefor for use in conjunction with the pattern of mark spaces 112 marked on ballot 100 for determining the voting selections made thereon.

Simply put and by way of example, reader 1031 reads the VID number 120 from a first ballot 100 of form A and signals same to processor 1050 which then provides the mark space template for ballots 100 of form A for reading the marked voting selections from first ballot 100 read by optical reader 1032. The marked voting selections read by reader 1032 are then tabulated as votes by vote counter 1060. Next, reader 1031 reads the VID number 120 from a second ballot 100 of form B and signals same to processor 1050 which then provides the mark space template for ballots 100 of form B for reading the marked voting selections from second ballot 100 read by optical reader 1032, which read marked voting selections are then tabulated as votes by vote counter 1060. Next, reader 1031 reads the VID number 120 from a third ballot 100 of form C and signals same to processor 1050 which then provides the mark space template for ballots 100 of form C for reading the marked voting selections from third ballot 100 read by optical reader 1032, which read marked voting selections are then tabulated as votes by vote counter 1060. If the next ballot is of form B, for example, reader 1031 reads the VID number 120 from that ballot 100 of form B and signals same to processor 1050 which then provides the mark space template for ballots 100 of form B for reading the marked voting selections from that ballot 100 read by optical reader 1032, which read marked voting selections are then tabulated as votes by vote counter 1060, and so forth. The process repeats for each ballot read by reader 1000 wherein the template for each ballot is selected by processor 1050 responsive to the VID number 120 read from that ballot, i.e., specifically responsive to the jurisdictional information defined in fields 121–127 of VID number 120.

Accordingly, an optical reader for reading paper ballots having a jurisdiction identifier thereon and having voting selections marked thereon, comprises a transport path for transporting paper ballots between an input and an output thereof, a first optical reader for reading the jurisdiction identifier of each paper ballot transported on said transport path, and a second optical reader for reading the voting selections marked on each paper ballot transported on said transport path. A processor receives the jurisdiction identifier read by the first optical reader for each paper ballot for selecting a template for reading in accordance with the selected template the voting selections marked on each paper ballot, whereby the voting selections marked on each paper ballot are read in accordance with a template corresponding to the jurisdiction identifier for that paper ballot.

In addition and optionally, processor 1050 may include optical character recognition (OCR) software to provide alphanumeric outputs of the information in the VID field read by reader 1031 and/or of write-in information in the write-in portions of the voting fields read by reader 1032 according to the template selected by processor 1050. It is preferred that reader 1000 move ballots through transport path 1030 at the rate of at least about 10–12 inches per second (about 25–30 cm/sec.) so that ballots on either 8½×11 inch paper and/or on A4 paper may be read at a rate of at least about one ballot per second. It is also preferred that readers 1031 and 1032 have a resolution of at least about 100 dpi or greater, and it is desirable in some cases that reader 1000 provide dual-side document scanning.

Reader 1000 may be utilized at a polling place or other voting location for "checking" ballots marked by voters prior to their being voted, i.e. officially deposited into a collection container. In this case, vote counter 1060 is eliminated and no record of the actual voting selections marked is retained; processor 1050 processes only the VID number 120 and the mark space 112 regions to select the corresponding ballot template and to verify that the proper number of mark spaces have been marked for each contest and/or question.

Reader 1000 in checking a ballot preferably signals or otherwise provides a notice or indication if a ballot is under voted (i.e. less than the required number of spaces have been marked for each contest/question) or is over voted (i.e. more than the required number of spaces have been marked for each contest/question, which may invalidate a vote in a contest/question or may invalidate an entire ballot) or is otherwise incorrectly marked. Ballot checking may be utilized with straight voting, ranked voting, and/or cumulative voting similarly, e.g., indicating if improper ranking has been marked and/or if the wrong number of cumulative votes have been marked. While such checking function advances the goal that ballots reflect voter intent, it can reduce but not eliminate under voting and over voting; however, it will at least give the voter an opportunity to correct such condition or at least indicate an intentional "no vote" if a "No Vote" or "Abstain" mark space 112 is marked.

Reader 1000 utilized for ballot checking may also have a printer associated therewith for providing a tangible voting record, e.g., a printed receipt, to each voter, as described in patent applications Ser. Nos. 09/737,306 and 10/255,348. Desirably, such printed receipt includes the complete VID 120 including the unique random portion 381 so that the voter may track and verify his vote where the voting results are available via an Internet and/or other posting including the VID. Preferably, the VID read from the read ballot is printed on the receipt. If the receipt includes a record of the voter's voting selections, the receipt also provides an immediate confirmation that the ballot can be read and of the voting selections marked, whereby the voter may seek correction of any error and/or omission prior to voting his ballot.

While the reader arrangement described in the immediately preceding paragraphs is preferred, optical ballots 100 including a VID number as described herein may be sorted and read by conventional readers in the conventional manner, assuming, of course, that the election officials are willing and able to sort the paper ballots into groups of like form and to program the conventional readers for each particular ballot form before running ballots of that form therethrough for counting. Ballot readers as described herein may utilize all or part of conventional ballot readers and/or may utilize parts of conventional office equipment such as copiers, scanners, facsimile (fax) machines, and other commercial imaging and/or scanning devices, and the like, e.g., for imaging and/or optically reading the information contained on an optically-readable paper ballot.

Examples of conventional ballot readers include the PAGES CAN II reader available from Peripheral Dynamics, Inc. located in Plymouth Meeting, Pa., and the SCANMARK ES2800 reader available from Scantron located in Tustin, Calif. Examples of commercial imaging scanners include types DR5020 and DR5080 available from Canon Electronics, Inc. located in Japan, and type IS330DC available from Ricoh Company located in Japan. Examples of commercial printers suitable for ballot printing include the ImageRUNNER 600 and 105 available from Canon Electronics, Inc., and similar equipment available from Hewlett Packard of Palo Alto, Calif. and Fujitsu of Japan.

Figure 8:
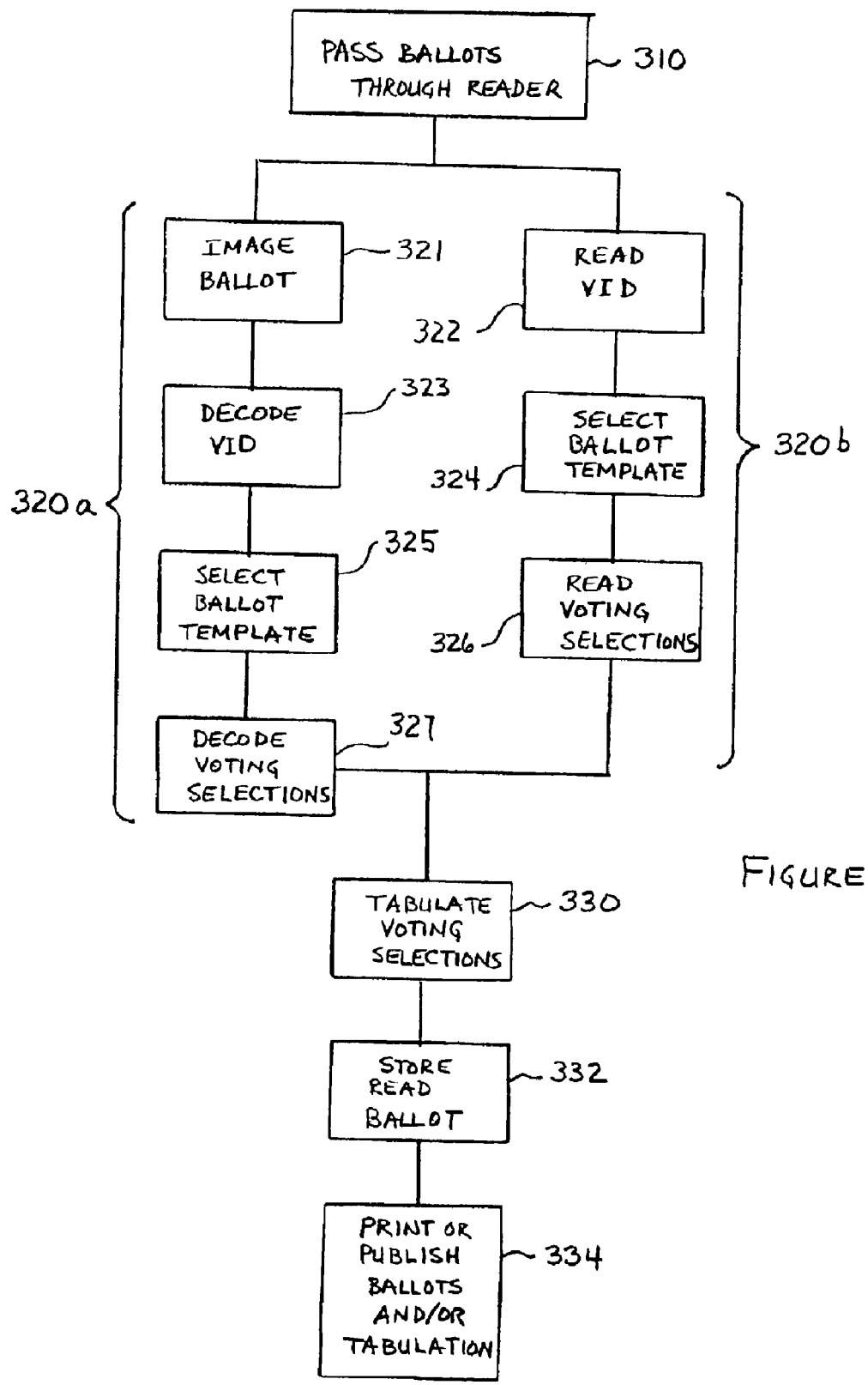
FIG. 8 is a schematic flow diagram of an example ballot reading process compatible with the apparatus of FIG. 7.

FIG. 8 is a schematic flow diagram of an example ballot reading process 300 compatible with the apparatus of FIG. 7. Process 300 commences with passing 310 the voted ballots through a ballot reader, e.g., along a transport path of an optical scan reader, wherein the ballots do not need to be, but may be, sorted according to jurisdictions and/or ballot formats. The ballots are individually and serially read/imaged and the voting information thereon is read/decoded via either of alternative processes 320a or 320b. Path 320a comprises imaging 321 each ballot and then decoding the voting selection information thereon in two decoding steps 323, 327. Path 320b comprises reading the ballots in two steps 322, 326, wherein the voting selection information is read in second reading step 326. In either path, the ballot template (e.g., a set of computer instructions and/or statements and/or data defining a pattern of ballot mark spaces for a ballot) for reading/decoding the voting information is selected responsive to the voting identifier and/or ballot identifier read/decoded in the first reading/decoding step 322, 323.

Ballot imaging process 320a comprises imaging 321 the ballot to acquire an image of the voting information thereon and then decoding 323 a ballot identifier (e.g., VID) from the ballot image. While the entire ballot identifier (e.g., VID) may be decoded, only that portion thereof that contains jurisdiction information (e.g., ones of fields 381–386) need be decoded; decoding the unique random identifier portion (e.g., field 387) is optional). The decoded identifier correlates to a particular ballot format represented by a ballot template, and the ballot template corresponding to the decoded identifier is selected 325 from a database or other collection and/or set of ballot templates for decoding 327 the voting selection information from the ballot image previously imaged 321. Thus, each ballot of a mixed set of ballots is read (decoded) according to a template corresponding to the particular ballot format to obtain the voting selection information thereon.

Ballot imaging process 320b comprises reading 322 the ballot to read a ballot identifier (e.g., VID) thereon, typically in a predefined location, area or region of the ballot. While the entire ballot identifier (e.g., VID) may be read, only that portion thereof that contains jurisdiction information (e.g., ones of fields 381–386) need be read; reading the unique random identifier portion (e.g., field 387) is optional). The read identifier correlates to a particular ballot format represented by a ballot template, and the ballot template corresponding to the read identifier is selected 324 from a database or other collection and/or set of ballot templates for reading 326 the voting selection information from the ballot. While the entire ballot may be read 326, only that portion containing voting selection information according to the selected template 324 need be read. Thus, each ballot of a mixed set of ballots is read according to a template corresponding to the particular ballot format to obtain the voting selection information thereon.

It is noted that the foregoing reading/imaging 321, 322, 323, 326, 327 of the VID and voting selections, and the template selecting 324, 325, and/or the tabulating 330 and storing 332, may be performed in "real-time" as each ballot is read, i.e., the voting selections are read/decoded, stored 332 and tabulated 330 substantially contemporaneously with the ballot passing through reader 1010. Alternatively, the VID and voting selections read/imaged 321, 322, 326 may be stored in "real-time" as each ballot passes through reader 1010, and the template selecting 324, 325, the decoding/reading 322, 323, 326, 327 of the stored VID and voting selections, and the tabulating 330 and storing 332 thereof may be performed after some or all of the ballots have passed through reader 1010, i.e. delayed in time.

The voting selection information read/decoded 326, 327 is tabulated 330 for counting the vote and determining an election outcome/result. The read/decoded 326, 327 voting selection information may be stored 332, e.g., for later verification, auditing, confirmation and/or comparison with the paper ballots and the like, and may be printed and/or otherwise published 334, in whole or in part, in connection therewith. The steps of tabulating 330, storing 332 and/or printing/publishing 334 may be either or without the voter identifier (e.g., VID) and/or other ballot identifier.

An advantage may obtain, however, where the tabulated 330 and/or stored 332 voter selection information is associated with the identifier where the identifier is not related and/or relatable to the identity of a particular voter, i.e. the voter remains anonymous. In such case, particular ballots can be inspected against the electronic records without compromising voter anonymity and privacy, including publishing voting results on a ballot-by ballot basis, e.g., via the Internet, as described in incorporated patent applications Ser. Nos. 09/737,306 and 10/255,348. Such ability to verify that a ballot has been received and has been counted could be desirable for absentee and/or provisional voters, as well as for general voting.

Figure 9:
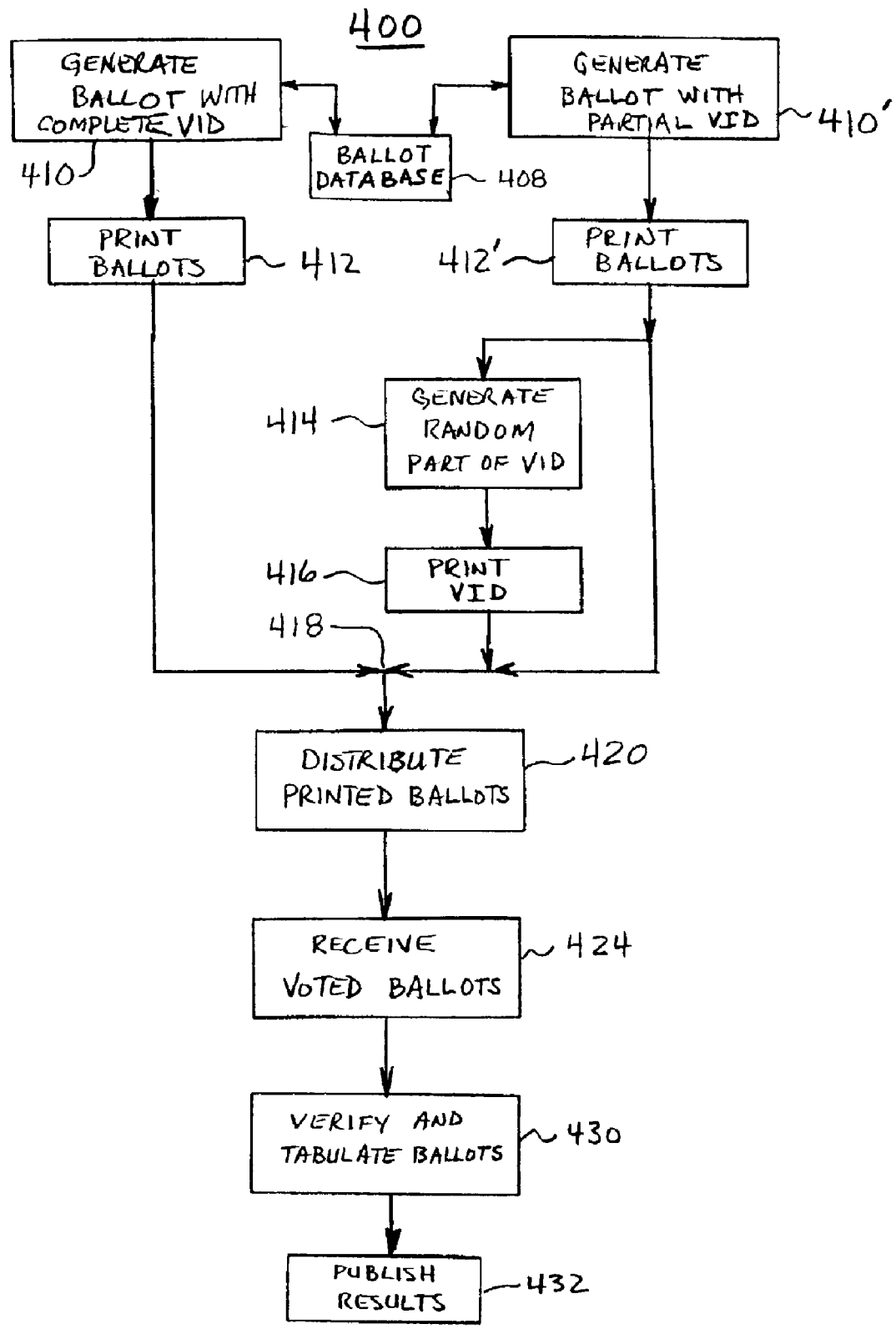
FIG. 9 is a schematic flow diagram of an example process for generating the ballots of FIGS. 1, 3A–3C and 4.

FIG. 9 is a schematic flow diagram of an example process 400 for generating the ballots of FIGS. 1, 3A–3C and 4. In process 400, a ballot is generated 410, 410' including the contests and/or questions to be presented to the voters generated from information entered by election officials prior to an election. Typically, election officials generate a database 408 of ballot forms (styles) for the various jurisdictions, districts, polling locations and the like, and in the case of a primary, for each political party, each being associated with a particular jurisdictional portion of the voter identifier (VID). In printing ballots, the appropriate form/style is selected from the database 408 thereof in accordance with the jurisdictional portion of a particular VID, e.g., ballot generation as described herein and/or in incorporated patent applications Ser. Nos. 09/737,3 06 and 10/255,348.

Ballots may be generated 410 with a complete voter identifier (VID), i.e. an identifier including the jurisdictional information (e.g., fields 381–386) and a unique random identifier (e.g., field 387), and printed 412 as a set of unique ballots, either in advance of an election and/or "on-demand" in an election. Ballots may be generated 410' with a partial voter identifier (VID), i.e. an identifier including the jurisdictional information (e.g., fields 381–386), and printed 412' as a set of identical ballots either in advance of an election (e.g., conventional printing) and/or "on-demand" in an election. Such ballots may be utilized directly, i.e. without the unique identifier portion of the VID, or a unique random identifier (e.g., field 387) portion of a voter identifier may be generated 414 and may be printed 416 on the ballots to provide a set of unique ballots and/or may be printed on labels to be affixed to the printed ballots at a later time. A list of the voter identifiers utilized on ballots may be retained, e.g., in a database on a computer, for later use in verifying and/or authenticating voted ballots received 424, and may be without compromising voter anonymity and privacy where no record is kept that could relate a particular ballot to a particular voter. Further, printed ballots including the VID may be placed into envelopes, e.g., absentee ballots placed into mailing envelopes, by automating equipment to reduce the possibility of human action that may compromise privacy and/or anonymity.

In either case, the printed ballots with a complete VID and/or with a partial jurisdictional VID are distributed 420 for being utilized by voters in voting in an election in accordance with the applicable election procedure, e.g., by marking their voting selections in the mark spaces provided.

It is noted that the ballots may be distributed 420 in advance of an election, e.g., as absentee ballots, may be distributed 420 during an election as the usual ballot for all voters, e.g., at polling locations on an election day or days, and/or may be distributed 420 to particular voters, e.g., to voters voting provisionally.

Marked (voted) ballots are received 424, e.g., by election officials, the ballots having been submitted by mail, in-person or other delivery method, e.g., in the case of absentee ballots, by deposit in ballot containers or delivery to an election official at a polling location or other designated location, e.g., as the usual ballots voted and/or as provisional ballots. Ballots voted as absentee and/or provisional are typically sealed in a plain opaque envelope after the voter marks his voting selections thereon and the plain envelope is then sealed inside an opaque outer envelope on which is marked the voter's name and address, the election, jurisdiction, date, and/or other particulars, and a voter signature, and/or the identification and signature of a witness. Each ballot is verified 430, i.e. the information on the outer envelope is utilized by election officials to determine whether the ballot sealed therein should be opened and counted. Such determination may include, e.g., whether the voter is eligible to vote, whether the voter signature on the envelope matches the voter signature in the voter registration records, and/or whether the ballot is a valid ballot for the particular election (possibly including whether the ballot is a duplicate of another vote in the name of the voter).

The verified (qualified) received ballots are then read as described herein (e.g., see FIGS. 7 and 8) and tabulated 430, without the need for being sorted by election and/or ballot style and/or jurisdiction before reading and tabulating 430, to determine the result or outcome of the voting. Before and/or during the reading and tabulating 430, the ballots may be verified/authenticated by comparing the complete VID number on each ballot against a list of valid VID numbers for the election, e.g., a computer database listing the VID of each issued ballot, and/or by manual inspection by an election official.

The result/outcome of the election is certified and/or published 432 as required by the applicable election laws. Preferably, the tabulating 430 of voted ballots preserves the specific voting selections read from each ballot and the associated VID (e.g., voting record) of that ballot, as well as tallying the vote totals for determining the election outcome, and a listing of the voting selections and VID (voting record) from all ballots are published where the public can access same, e.g., on a bulletin board, in a printed publication and/or on an Internet web site. Thus, each voter knowing his VID can access the listing and find the vote recorded from his ballot by its VID and can satisfy himself that his vote has been counted and nas been counted correctly and accurately. Where the voter retains a copy of his ballot and/or is issued a voting receipt, such may be utilized for correcting an incorrectly recorded vote and/or an improperly disqualified ballot where permitted by applicable law.

Figure 10:
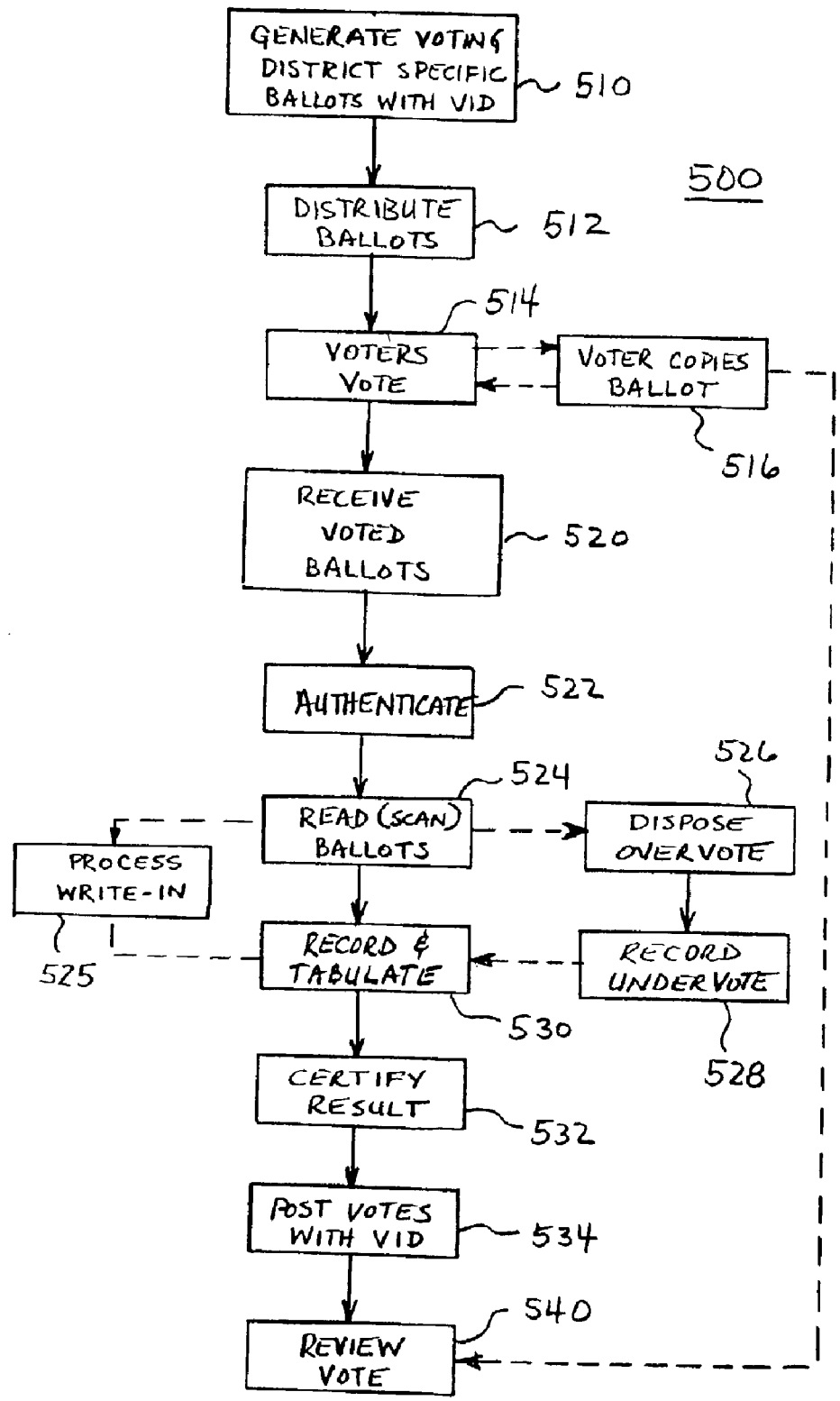
FIG. 10 is a schematic flow diagram of an example voting process utilizing the ballot of FIGS. 1, 3A–3C and 4.

FIG. 10 is a schematic flow diagram of an example voting process 500 utilizing the ballot of FIGS. 1, 3A–3C and 4. Voting district specific ballots are generated 510 and distributed 512 for being voted. Voters vote 514 by marking the mark spaces on the ballot corresponding to their desired voting selections (votes) and submit their ballots in accordance with applicable election procedure. A voter may copy 516 his marked ballot for later checking that his vote was counted and was counted properly. Voted ballots are received 520 and the received voted ballots are authenticated 522 before being read and counted. All the foregoing may be as described in relation to FIG. 9.

Authenticated (valid) ballots are read (scanned) 524 to read the VID number printed thereon and the voting selections marked thereon, i.e. the voting selections marked on each ballot are read according to a ballot template corresponding to the jurisdictional portion of the VID selected based upon the jurisdictional portion of the VID read 524 from each ballot. Write-in votes are preferably read and processed 525 by optical character recognition (OCR) software for computer tabulation, and/or ballots having write-in votes may be separated for manual processing (e.g. manual deciphering and posting) 525 and/or inspection and/or verification. As described, ballots are read 524 according to ballot templates selected based upon the read VID and so do not need to be sorted by jurisdiction and/or style prior to reading 524.

Ballots over-voted (i.e. wherein more mark spaces than are permitted to be marked have been marked) may be disposed 526 by being separated or ejected for manual inspection and/or invalidation, and/or the valid portions of the voting selections may be recorded and tabulated 530, depending on the treatment of over-voted ballots under applicable law. Some jurisdictions invalidate only the voting selections made in over-voted contests and other jurisdictions invalidate an entire ballot containing any over-vote. Ballots under-voted (i.e. wherein fewer mark spaces than are permitted to be marked have been marked) may be recorded separately 526 and/or the under-vote may be recorded separately 526 (e.g., for review and/or for statistical purposes), and the voting selections thereon are recorded and tabulated 530, and/or under-voted ballots may be separated for manual inspection, depending on the treatment of under-voted ballots under applicable law. Further, the read and/or imaged information for each under- and/or over-voted ballot may be printed out for review by election officials.

The voting selections from read 524 ballots is recorded 530 including the VID number from each ballot, i.e. the voting selections and VID of each ballot are recorded and stored as an individual voting record, and the voting selections therefrom are also tabulated 530 to determine the result of voting. Preferably, the information read from each ballot, e.g., voting record of voting selections and VID, are stored in plural separate and independent memory devices, e.g., hard drives, flash memories, optical CD-ROM and the like, as described in incorporated patent applications Ser. Nos. 09/737,306 and 10/255,348, for preservation with the original paper ballots in accordance with applicable procedures.

When the voting results tabulations are properly verified, the result is certified 532 as official. Thereafter, the certified results may be posted/published 534, e.g., on an Internet web site, including both the tabulated 530 result and/or the voting records including VID of each individual ballot, thereby enabling any voter knowing his VID, e.g., from a ballot copy and/or a printed voting receipt, to review 540 the voting record corresponding to that VID to ascertain whether it was counted and, if counted, whether it was correctly counted. The posted/published 534 voting records can include not only those voting records for ballots that were authenticated 522 and thus counted 524, 530, but may also include the voting records for ballots that were disqualified or otherwise not counted and/or not completely counted and/or the fact that the ballot of that VID was disqualified or was not counted and/or not completely counted.

In connection with the steps of reading 524, recording and tabulating 530 and/or the processing of write-in, under and over-votes 525, 526, 528, for example, election officials may be provided with administrative and management tools, such as user rights and levels of access, passwords and the like, the keeping of logs of events and/or actions performed, functions to export (e.g., by electronic file transfer and/or via floppy disks, CD-ROMs and other tangible media) all or part of the files of vote tabulations, voting records, vote statistics and the like, and/or for the printing of various reports and/or forms, such as vote tallies, voting reports, vote certification forms and the like.

While the VID information may be provided to the voter on a paper ballot and/or on a paper or other identification card, or may be entered by an election official at the election office and/or polling place for printing on a ballot, VID information may be coded into the memory of a smart card and the voting machine may include a smart card reader for reading the coded VID stored therein where the voting machine is utilized to print an optically scan-able ballot including the VID. Identification of the voter at the time for voting may utilize the VID information stored in the voter's smart card, or may be by traditional identification methods, such as signature verification, conventionally utilized by various jurisdictions.

Alternatively, a unique identifier stored in the voting machine may be read into the voter's smart card and may either supplement or replace the voter number stored therein at issuance, whereby the pre-stored voter number may be used to verify registration and/or the unique identifier may be utilized to preserve voter anonymity and privacy. Preferably for voter privacy, only the unique identifier, e.g., VID, is stored in the voter smart card and/or on a printed allot at the completion of a voting session. A database of unique identifiers valid only for a particular election may be pre-loaded into the voting machines and/or vote tabulating machines prior to that election, and/or smart cards may be collected when voted, for security.

While the present invention has been described in terms of the foregoing exemplary embodiments, variations within the scope and spirit of the present invention as defined by the claims following will be apparent to those skilled in the art. For example, while the VID number of a ballot must be machine readable for automatic tabulation of votes, the machine-readable VID may be the same as the desirable human-readable VID, i.e. alphanumeric characters readable by people as well as machines (e.g., readers having OCR) may be utilized.

Further, the VID may include any one or more of the fields described and/or additional or different fields, as may be appropriate and/or desirable. Each voter identifier (VID) includes one or more fields containing a representation of jurisdictional information and/or a ballot form, and may include one or more fields containing a unique random portion. A voter identifier may also be referred to as a ballot identifier and/or a voting session identifier, e.g., where the ballot is generated with an identifier in a voting session of an election, i.e. in recording a voter's vote.

While paper ballots are most commonly read by optical scanning when the ballot passes a light source and the marked/unmarked state of the mark regions is sensed by an associated light detector, marking may be detected by other means such as a mechanical and/or electrical sensing and detecting means.

In addition, while the apparatus and method herein are typically described in relation to voting apparatus having a user interface, e.g., a display and a data entry device such as a touch screen, either or both may be eliminated and/or rendered inoperative, if desired, and replaced by the optical ballot reading apparatus such as that described.

What is claimed is:

1. An optical reader for reading paper ballots having a jurisdiction identifier thereon and having voting selections marked thereon, wherein the jurisdiction identifier identifies the jurisdiction or jurisdictions to which each ballot pertains, comprising:
    means for imaging each paper ballot including imaging the jurisdiction identifier thereof and the voting selections marked thereon; and
    a processor for receiving the imaged jurisdiction identifier for each paper ballot for selecting a template and for recording the voting selections marked on each paper ballot in accordance with the selected template,
    whereby the voting selections marked on each paper ballot are imaged and recorded in accordance with a template corresponding to the jurisdiction identifier for that paper ballot.

2. The optical reader of claim 1 wherein said means for imaging comprises:
    a first optical reader for imaging the jurisdiction identifier of each paper ballot; and
    a second optical reader for imaging the voting selections marked on each paper ballot in accordance with the selected template.

3. The optical reader of claim 1 wherein said means for imaging comprises:
    an optical imager for imaging each paper ballot path;
    means for decoding the jurisdiction identifier of the image of each paper ballot; and
    means for decoding the voting selections marked on each paper ballot in accordance with the selected template.

4. The optical reader of claim 1, further comprising means for tabulating the jurisdiction identifier and the voting selections marked on each paper ballot in accordance with a jurisdiction represented by the jurisdiction identifier and the selected template.

5. The optical reader of claim 1 wherein the paper ballots each have a corresponding unique ballot identifier, and wherein said processor records the voting selections imaged from each paper ballot and the corresponding jurisdiction identifier and unique ballot identifier of that paper ballot.

6. The optical reader of claim 5 further comprising means for publishing the voting selections read from each of the paper ballots and the corresponding jurisdiction identifier and unique ballot identifier of that paper ballot.

7. The optical reader of claim 1 wherein the paper ballots each have a corresponding unique ballot identifier, and wherein said processor records the voting selections read from each paper ballot and the corresponding jurisdiction identifier and unique ballot identifier read from that paper ballot.

8. The optical reader of claim 7 further comprising means for publishing the voting selections read from each paper ballot and the corresponding jurisdiction identifier and unique ballot identifier read from that paper ballot.

9. The optical reader of claim 1 wherein the paper ballots each have a corresponding unique ballot identifier thereon, and wherein said processor processes the unique ballot identifier of each paper ballot for authenticating each paper ballot.

10. An optical reader for reading paper ballots having a jurisdiction identifier thereon and having voting selections marked thereon, wherein the jurisdiction identifier identifies the jurisdiction or jurisdictions to which each ballot pertains, comprising:
    a first optical reader for reading the jurisdiction identifier of each paper ballot;

a processor for receiving the jurisdiction identifier read by said first optical reader for each paper ballot for selecting a template for reading in accordance with the selected template the voting selections marked on each paper ballot; and a second optical reader for reading the voting selections marked on each paper ballot in accordance with the selected template, whereby the voting selections marked on each paper ballot are read in accordance with a template corresponding to the jurisdiction identifier for that paper ballot.

11. The optical reader of claim 10 further comprising means for tabulating the jurisdiction identifier and the voting selections marked on each paper ballot in accordance with a jurisdiction represented by the jurisdiction identifier and the selected template.

12. The optical reader of claim 10 wherein the paper ballots each have a corresponding unique ballot identifier thereon, and wherein said processor processes the unique ballot identifier of each paper ballot for authenticating each paper ballot.

13. An optical reader for reading paper ballots having a jurisdiction identifier thereon and having voting selections marked thereon, wherein the jurisdiction identifier identifies the jurisdiction or jurisdictions to which each ballot pertains, comprising:

an optical imager for imaging each paper ballot;

means for decoding the jurisdiction identifier of the image of each paper ballot;

a processor for receiving the decoded jurisdiction identifier of each paper ballot for selecting a template for decoding in accordance with the selected template the voting selections marked on each paper ballot; and means for decoding the voting selections marked on each paper ballot in accordance with the selected template, whereby the voting selections marked on each paper ballot are decoded in accordance with a template corresponding to the jurisdiction identifier for that paper ballot.

14. The optical reader of claim 13 further comprising means for tabulating the jurisdiction identifier and the voting selections marked on each paper ballot in accordance with a jurisdiction represented by the jurisdiction identifier and the selected template.

15. The optical reader of claim 13 wherein the paper ballots each have a corresponding unique ballot identifier, and wherein said processor records the voting selections imaged from each paper ballot and the corresponding jurisdiction identifier and unique ballot identifier imaged from that paper ballot.

16. The optical reader of claim 15 further comprising means for publishing the voting selections imaged from each paper ballot and the corresponding jurisdiction identifier and unique ballot identifier imaged from that paper ballot.

17. The optical reader of claim 13 wherein the paper ballots each have a corresponding unique ballot identifier thereon, and wherein said processor processes the unique ballot identifier of each paper ballot for authenticating each paper ballot.

18. A method for optically reading paper ballots having a jurisdiction identifier thereon and having voting selections marked thereon, wherein the jurisdiction identifier identifies the jurisdiction or jurisdictions to which each ballot pertains, comprising:

reading the jurisdiction identifier of each paper ballot;

selecting a template responsive to the read jurisdiction identifier for reading in accordance with the selected template the voting selections marked on each paper ballot; and reading the voting selections marked on each paper ballot in accordance with the selected template, whereby the voting selections marked on each paper ballot are read in accordance with a selected template corresponding to the jurisdiction identifier for that paper ballot.

19. The method of claim 18 wherein the paper ballots have different jurisdiction identifiers, and wherein the paper ballots are not sorted according to the jurisdiction identifier prior to said reading.

20. The method of claim 18 wherein said selecting and said reading the voting selections marked on each paper ballot are performed substantially contemporaneously.

21. The method of claim 18 further comprising:

comparing the voting selections read from each ballot to the selected template for providing an indication of an under vote, an indication of an over vote, or an indication of an under vote and an over vote of each paper ballot; or tabulating the voting selections read from each of the paper ballots; or comparing the voting selections read from each ballot to the selected template for providing an indication of an under vote, an indication of an over vote, or an indication of an under vote and an over vote of each paper ballot, and tabulating the voting selections read from each of the paper ballots.

22. The method of claim 21 wherein said tabulating the voting selections read from each of the paper ballots includes tabulating the voting selections according to a jurisdiction represented by each jurisdiction identifier.

23. The method of claim 18 wherein the paper ballots each have a corresponding unique ballot identifier, and wherein said reading the jurisdiction identifier includes reading the corresponding unique ballot identifier.

24. The method of claim 23 further comprising publishing the voting selections read from each paper ballot and the corresponding jurisdiction identifier and unique ballot identifier of that paper ballot.

25. The method of claim 23 further comprising authenticating each paper ballot responsive to the unique ballot identifier read therefrom.

26. The method of claim 18 further comprising, prior to said reading and for each of a plurality of voters, producing by a voting machine of a paper ballot including voting selections made by a voter.

27. The method of claim 26 wherein said producing a paper ballot comprises printing the voting selections on a ballot form or printing a ballot form including the voting selections.

28. The method of claim 26 wherein the voter makes voting selections using any of a keyboard, a touch screen, a button, a switch, voice recognition apparatus, a Braille keyboard, a pen with writing recognition interface.

29. A method for reading ballots comprising:

reading or imaging each ballot by a reader located at a place accessible to a voter before the voter submits the ballot, said reading or imaging each ballot including reading or imaging a jurisdiction identifier thereof for selecting a template and reading or imaging voting selections marked on the ballot, wherein the jurisdiction identifier identifies the jurisdiction or jurisdictions to which each ballot pertains;

displaying the voting selections marked on each ballot in accordance with the selected template, but not recording or storing the voting selections; and thereafter, submitting the ballot for counting, whereby the voting selections marked on the ballot are displayed in accordance with the template for review by a voter prior to submitting the ballot for counting.

30. A method for reading ballots comprising:

making voting selections using any of a keyboard, a touch screen, a button, a switch, voice recognition apparatus, a Braille keyboard, a pen with writing recognition interface;

then producing a printed ballot by printing the voting selections on a ballot form or printing a ballot form including the voting selections;

repeating said making and said producing steps for a plurality of voters, and then:

reading or imaging each printed ballot by a reader located at a place accessible to a voter before the voter submits the ballot, said reading or imaging including determining voting selections marked on the ballot in accordance with a template corresponding to a jurisdiction or jurisdictions to which the read or imaged printed ballot pertains;

displaying the voting selections marked on each ballot in accordance with the template corresponding to the jurisdiction or jursidictions but not recording or storing the voting selections; and thereafter, submitting the ballot for counting, whereby the voting selections marked on the ballot are read and displayed in accordance with the template for review by a voter prior to submitting the ballot for counting.

31. A method for reading paper ballots having a jurisdiction identifier thereon and having voting selections marked thereon, wherein the jurisdiction identifier identifies the jurisdiction or jurisdictions to which each ballot pertains, comprising:

imaging each paper ballot;

decoding the jurisdiction identifier of the image of each paper ballot;

selecting responsive to the decoded jurisdiction identifier a template for decoding the voting selections marked on each paper ballot; and decoding the voting selections marked on each paper ballot in accordance with the selected template, whereby the voting selections marked on each paper ballot are decoded in accordance with a template corresponding to the jurisdiction identifier for that paper ballot.

32. The method of claim 31 wherein the paper ballots have different jurisdiction identifiers, and wherein the paper ballots are not sorted according to the jurisdiction identifier prior to said imaging.

33. The method of claim 31 wherein said selecting and said decoding the voting selections marked on each paper ballot are performed substantially contemporaneously.

34. The method of claim 31 further comprising:

comparing the voting selections decoded from each ballot to the selected template for providing an indication of an under vote, an indication of an over vote or an indication of an under vote and an over vote of each paper ballot; or tabulating the voting selections decoded from each of the paper ballots; or comparing the voting selections decoded from each ballot to the selected template for providing an indication of an under vote, an indication of an over vote, or an indication of an under vote and an over vote of each paper ballot, and tabulating the voting selections decoded from each of the paper ballots.

35. The method of claim 34 wherein said tabulating the voting selections decoded from each of the paper ballots includes tabulating the voting selections according to a jurisdiction represented by each jurisdiction identifier.

36. The method of claim 31 wherein the paper ballots each have a corresponding unique ballot identifier, and wherein said decoding the jurisdiction identifier includes decoding the corresponding unique ballot identifier.

37. The method of claim 36 further comprising publishing the voting selections decoded from each paper ballot and the corresponding jurisdiction identifier and unique ballot identifier decoded from that paper ballot.

38. The method of claim 36 further comprising authenticating each paper ballot responsive to the decoded unique ballot identifier.

39. The method of claim 31 further comprising, prior to said imaging and for each of a plurality of voters, producing by a voting machine of a paper ballot including voting selections made by a voter.

40. The method of claim 39 wherein said producing a paper ballot comprises printing the voting selections on a ballot form or printing a ballot form including the voting selections.

41. The method of claim 39 wherein the voter makes voting selections using any of a keyboard, a touch screen, a button, a switch, voice recognition apparatus, a Braille keyboard, a pen with writing recognition interface.

42. A reader for reading ballots comprising:

means for reading each ballot including imaging a jurisdiction identifier thereof and voting selections marked thereon, wherein the jurisdiction identifier identifies the jurisdiction or jurisdictions to which each ballot pertains; and a processor for receiving the jurisdiction identifier for each ballot for selecting a template and for recording the voting selections marked on each ballot in accordance with the selected template, whereby the voting selections marked on each ballot are read and recorded in accordance with a template corresponding to the jurisdiction identifier for that ballot.

43. The optical reader of claim 42 wherein the paper ballots each have a corresponding unique ballot identifier thereon, wherein said means for reading images the unique ballot identifier, and wherein said processor processes the unique ballot identifier of each paper ballot for authenticating each paper ballot.

44. A method for reading ballots comprising:

reading each ballot including reading a jurisdiction identifier thereof and voting selections marked thereon, wherein the jurisdiction identifier identifies the jurisdiction or jurisdictions to which each ballot pertains; and processing the jurisdiction identifier for each ballot for selecting a template; and recording the voting selections marked on each ballot in accordance with the selected template, whereby the voting selections marked on each ballot are read and recorded in accordance with a template corresponding to the jurisdiction identifier for that ballot.

45. The method of claim 44 wherein the paper ballots each have a corresponding unique ballot identifier thereon, wherein said reading includes reading the unique ballot identifier, and further comprising processing the unique ballot identifier of each paper ballot for authenticating each paper ballot.

46. The method of claim 44 further comprising, prior to said reading and for each of voters, producing by a voting machine of a paper ballot voting selections made by a voter.

47. The method of claim 46 wherein said producing a paper ballot comprises printing the voting selections on a ballot form or printing a ballot form including the voting selections.

48. The method of claim 46 wherein the voter makes voting selections using any of a keyboard, a touch screen, a button, a switch, voice recognition apparatus, a Braille keyboard, a pen with writing recognition interface.

49. A method for optically reading ballots comprising:

making voting selections using any of a keyboard, a touch screen, a button, a switch, voice recognition apparatus, a Braille keyboard, a pen with writing recognition interface;

then producing a paper ballot by printing the voting selection on a ballot form or printing a ballot form including the voting selections;

repeating said making and said producing steps for a plurality of voters, and then:

reading or imaging each paper ballot including reading the voting selections marked thereon; and processing the read or imaged paper ballot for determining the voting selections thereon in accordance with a template corresponding to a jurisdiction or jurisdictions to which the read or imaged paper ballot pertains, whereby the voting selections are marked on each paper ballot and are processed in accordance with the templeate corresponding to the jurisdiction or jurisdictions.

50. The method of claim 49 further comprising either:

recording the voting selections marked on each paper ballot in accordance with the template corresponding to the jurisdiction; or displaying the voting selections marked on each paper ballot in accordance with the template corresponding to the jurisdiction, but not recording or storing the voting selections.

51. The method of claim 49 wherein each paper ballot is associated with a jurisdiction and wherein said processing includes selecting the template corresponding to the jurisdiction in accordance with the jurisdiction associated with the paper ballot.

* * * * *